(12) United States Patent
Oshidari

(10) Patent No.: US 7,556,111 B2
(45) Date of Patent: Jul. 7, 2009

(54) IN-WHEEL DRIVE UNIT SUSPENSION DEVICE

(75) Inventor: Toshikazu Oshidari, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 226 days.

(21) Appl. No.: 11/593,166

(22) Filed: Nov. 6, 2006

(65) Prior Publication Data

US 2007/0102210 A1 May 10, 2007

(30) Foreign Application Priority Data

Nov. 10, 2005 (JP) .............................. 2005-326193

(51) Int. Cl.
*B60K 1/00* (2006.01)

(52) U.S. Cl. ............ 180/65.5; 280/124.1; 280/124.116; 280/124.128; 280/124.153; 280/124.154

(58) Field of Classification Search ............. 280/124.1, 280/124.116, 124.128, 124.153, 124.154; 180/65.5

See application file for complete search history.

(56) References Cited

U.S. PATENT DOCUMENTS

| 3,672,698 | A | | 6/1972 | Froumajou |
| 4,930,805 | A | * | 6/1990 | Takata et al. .......... 280/124.128 |
| 5,087,229 | A | * | 2/1992 | Hewko et al. ................ 475/149 |
| 5,597,175 | A | * | 1/1997 | Tuan .................... 280/124.111 |
| 5,918,692 | A | * | 7/1999 | Sekita et al. ................... 180/56 |
| 7,118,119 | B2 | * | 10/2006 | Amanuma ........... 280/124.135 |
| 2004/0036245 | A1 | * | 2/2004 | Mollhagen ............ 280/124.128 |
| 2005/0056471 | A1 | * | 3/2005 | Kurata ........................ 180/65.5 |

(Continued)

FOREIGN PATENT DOCUMENTS

GB 831684 3/1960

(Continued)

OTHER PUBLICATIONS

Sasaki et al., Electric Motor Cooling Structure for Motorcycle Driven by Electric Motor, Apr. 27, 1993, Japan Publication No.: 05-105178, Machine Translation of Description.*

(Continued)

*Primary Examiner*—Ruth Ilan
*Assistant Examiner*—James English
(74) *Attorney, Agent, or Firm*—Global IP Counselors, LLP

(57) ABSTRACT

An in-wheel drive unit suspension device suspends an in-wheel drive unit disposed inside a wheel on a vehicle body. The in-wheel drive unit suspension device has a longitudinally extending first arm member and a vertically extending vertical member. The first arm member has a in-wheel drive unit attachment portion pivotally attached to an outer circumferential portion of an in-wheel drive unit at a position radially spaced apart from a rotational center of the in-wheel drive unit, and a vehicle body attachment portion pivotally attached to the vehicle body so that the in-wheel drive unit is movable in a vehicle vertical direction with respect to a vehicle body. The vertical member has a first part of the vertical member attached to the outer circumferential portion of the in-wheel drive unit and a second part of the vertical member attached to the vehicle body to guide the in-wheel drive unit in the vehicle vertical direction.

14 Claims, 6 Drawing Sheets

U.S. PATENT DOCUMENTS

2005/0140110 A1* 6/2005 Lee et al. .............. 280/124.109
2005/0275183 A1* 12/2005 Amano ................ 280/124.128

FOREIGN PATENT DOCUMENTS

| JP | 08-276761 | 10/1996 |
|---|---|---|
| JP | 10-304645 | 11/1998 |
| JP | 2005-225486 | 8/2005 |
| JP | 2005225486 * | 8/2005 |
| JP | 2005-238989 | 9/2005 |

OTHER PUBLICATIONS

Sasaki et al., Electric Motor Cooling Structure for Motorcycle Driven by Electric Motor, Apr. 27, 1993, Japan Publication No.: 05-105178, Drawings.*

* cited by examiner

IN-WHEEL DRIVE UNIT SUSPENSION DEVICE

CROSS-REFERENCE TO RELATED APPLICATIONS

This application claims priority to Japanese Patent Application No. 2005-326193, filed on Nov. 10, 2005. The entire disclosure of Japanese Patent Application No. 2005-326193 is hereby incorporated herein by reference.

BACKGROUND OF THE INVENTION

1. Field of the Invention

The present invention generally relates to a suspension device of an in-wheel drive unit. More specifically, the present invention relates to a suspension device of an in-wheel drive unit having a motor as a power source disposed on an inner peripheral side of a wheel rim.

2. Background Information

An in-wheel drive unit suspension device has an advantage that a larger passenger compartment space positioned above a suspension device can be secured because the drive unit is disposed at a lower portion (wheel side) of the suspension device rather than at an upper portion of the suspension device (vehicle body member side). On the other hand, in a structure of the in-wheel drive unit suspension device in which the drive unit is suspended at the lower portion of the suspension device, there is a disadvantage that the driving reaction force of the drive unit imparts a vertically directed force that is inputted to the upper portion of the suspension device. Accordingly, Japanese Laid-Open Patent Publication No. 10-304645 discloses an example of a conventional in-wheel drive unit suspension device in which the in-wheel drive unit and the vehicle body are coupled together by an arm that extends in the vehicle widthwise direction to prevent the suspension device from imparting force in the vertical direction to the vehicle body as a result of the driving reaction force from the in-wheel drive unit.

Moreover, Japanese Laid-Open Patent Publication No. 8-276761 discloses another example of a conventional in-wheel drive unit suspension device in which left and right in-wheel drive units are coupled to the vehicle body by left and right arms, respectively, that extend in the lengthwise direction of the vehicle, and the left and right arms are coupled together via a beam that extends in the vehicle widthwise direction.

In view of the above, it will be apparent to those skilled in the art from this disclosure that there exists a need for an improved in-wheel drive unit suspension device. This invention addresses this need in the art as well as other needs, which will become apparent to those skilled in the art from this disclosure.

SUMMARY OF THE INVENTION

According to the conventional in-wheel drive unit suspension device disclosed in Japanese Laid-Open Patent Publication No. 10-304645, since the arm extends in the vehicle widthwise direction, it is necessary to provide a clearance space under the floor of the vehicle to allow the arm to swing. As a result, it becomes difficult to lower the floor of the vehicle body and to enlarge the passenger compartment space.

Moreover, in the conventional in-wheel drive unit suspension device disclosed in Japanese Laid-Open Patent Publication No. 8-276761, since the left and right arms are coupled together via the beam that extends in the vehicle widthwise direction, it is necessary to provide a clearance space to allow the beam to swing, which makes it difficult to lower the floor of the vehicle body and to enlarge the passenger compartment space.

Therefore, in the conventional in-wheel drive unit suspension devices as disclosed in the references discussed above, the size of the passenger compartment space cannot be made much larger even if the in-wheel motor is housed inside the road wheel in comparison to a suspension device that does not employ an in-wheel motor.

Accordingly, it is an object of the present invention to eliminate the aforementioned problems and to enable the floor of the vehicle body to be lowered and the passenger compartment space to be enlarged. It is also an object of the present invention to provide an in-wheel drive unit suspension device that is configured and arranged to prevent a situation where a vertical direction force acts on the vehicle body from the suspension device during driving and the like, and to prevent an adverse effect on the orientation of the vehicle body.

In order to achieve the objects of the present invention, an in-wheel drive unit suspension device is provided that basically comprises a first arm member and a vertical member. The first arm member extends generally in a vehicle longitudinal direction. The first arm member has a in-wheel drive unit attachment portion and a vehicle body attachment portion. The in-wheel drive unit attachment portion of the first arm member is configured and arranged to be pivotally attached to an outer circumferential portion of an in-wheel drive unit at a position radially spaced apart from a rotational center of the in-wheel drive unit, while the vehicle body attachment portion of the first arm member is configured and arranged to be pivotally attached to the vehicle body so that the in-wheel drive unit is movable in a vehicle vertical direction with respect to a vehicle body. The vertical member extends generally in a vehicle vertical direction with a first part of the vertical member being configured and arranged to be attached to the outer circumferential portion of the in-wheel drive unit and a second part of the vertical member being configured and arranged to be attached to the vehicle body to guide the in-wheel drive unit in the vehicle vertical direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
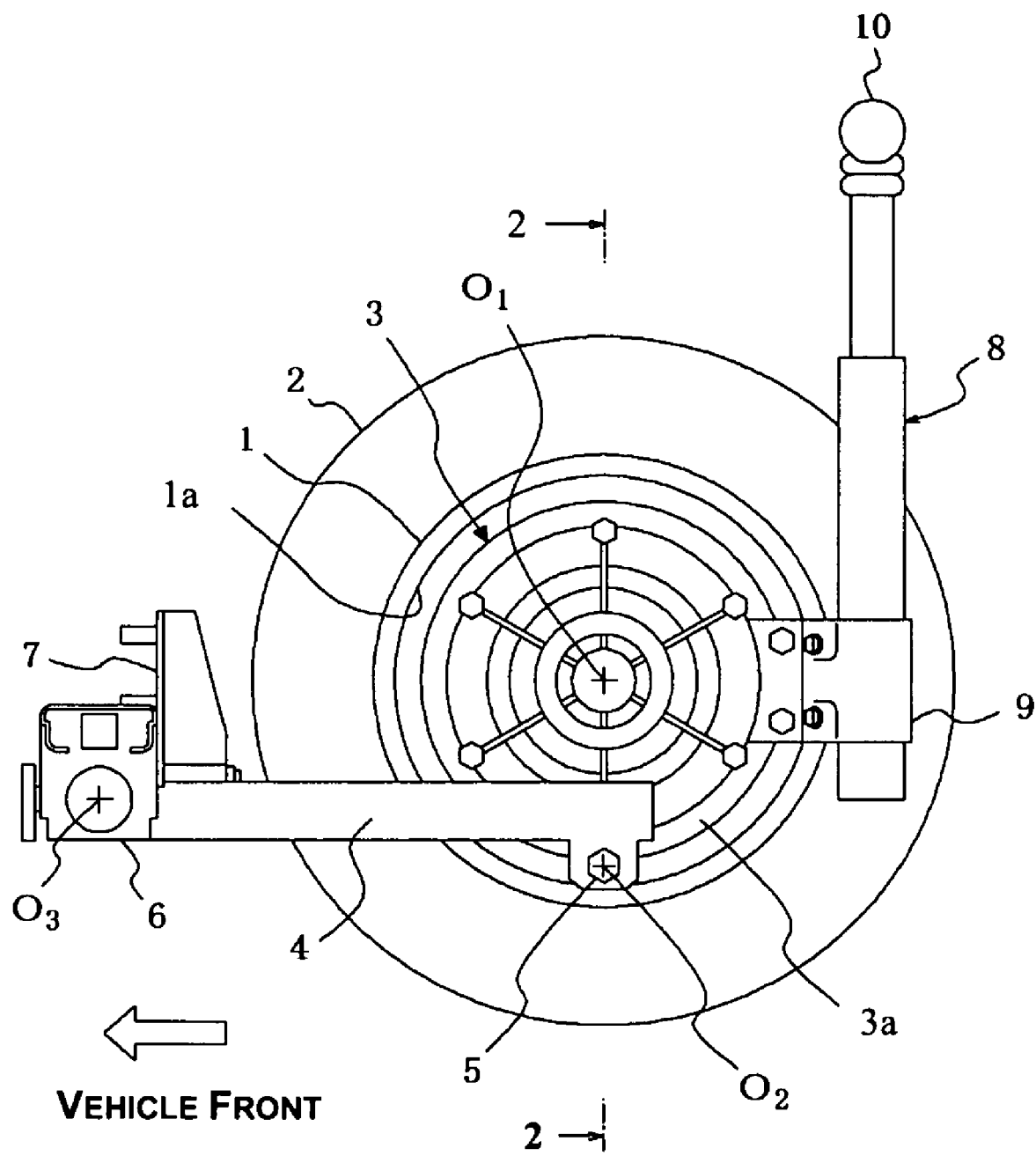
FIG. 1 is an overall side elevational view of an in-wheel drive unit suspension device as viewed from an inner side of a vehicle in accordance with a first embodiment of the present invention.
Figure 2:
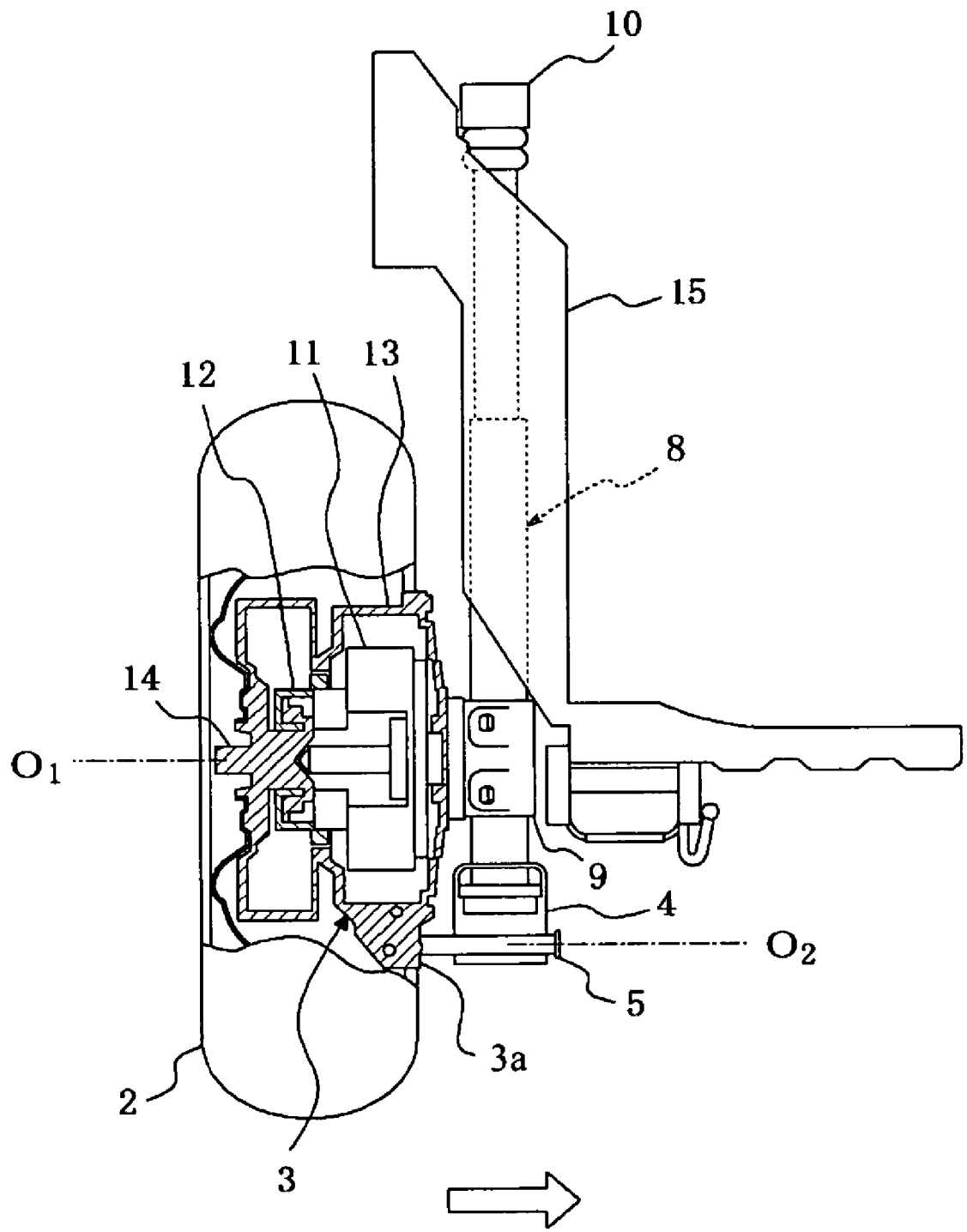
FIG. 2 is a partial cross sectional view of the in-wheel drive unit suspension device as taken along a section line 2-2 in FIG. 1 in accordance with the first embodiment of the present invention.
Figure 3:
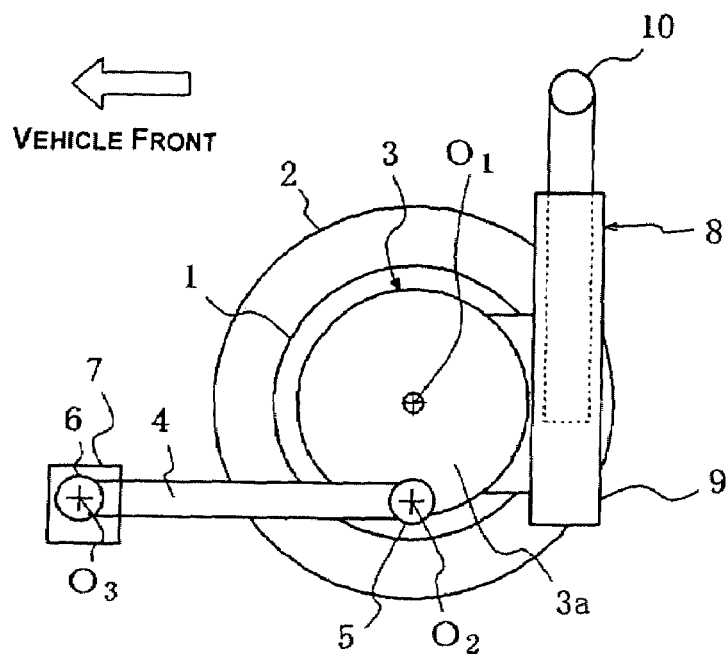
FIG. 3 is an overall schematic side elevational view of the in-wheel drive unit illustrated in FIGS. 1 and 2 as viewed from an inner side of a vehicle in accordance with the first embodiment of the present invention.

Referring initially to FIG. 1, an in-wheel drive unit suspension device is illustrated in accordance with a first embodiment of the present invention. FIG. 1 is an overall side elevational view of the in-wheel drive unit suspension device as viewed from an inner side of a vehicle. FIG. 2 is a partial cross sectional view of the in-wheel drive unit suspension device as taken along a section line 2-2 in FIG. 1. FIG. 3 is an overall schematic side elevational view of the in-wheel drive unit illustrated in FIGS. 1 and 2 as viewed from the inner side of the vehicle. In the following descriptions of the embodiments of the present invention, only the right wheel of the vehicle is illustrated to explain the structure of the in-wheel drive unit suspension device of the present invention. The structure of the in-wheel drive unit suspension device on the left wheel of the vehicle in accordance with the present invention is identical to the structure of the in-wheel drive unit of the right wheel illustrated herein, except that the structure of the in-wheel drive unit of the left wheel is a mirror image of the structure of the in-wheel drive unit of the right wheel with respect to a longitudinal axis of the vehicle.

As seen in FIG. 1, the vehicle includes at least a pair of left and right road wheels 1 (only the right wheel 1 is shown) each having a tire 2, and an in-wheel drive unit 3. The tire 2 is a conventional tire that is disposed on an outer periphery of a rim of the wheel 1 in a conventional manner. The in-wheel drive unit 3 is disposed in an inner space defined by a hollow cylinder-shaped inner wall 1a of the rim of the wheel 1. The wheel 1, the tire 2 and the in-wheel drive unit 3 are supported by a first arm member 4 and a vertical member 8 such that the wheel 1, the tire 2 and the in-wheel drive unit 3 are movable in a vertical direction with respect to a vehicle body.

As shown in FIG. 2, the in-wheel drive unit 3 includes a motor 11 (rotating electrical machine portion), a gear mechanism 12 and a casing 13. The motor 11 serves as a power source that drives the wheel 1. The casing 13 serves as an outer wall of the in-wheel drive unit 3. The motor 11 is coupled to an output shaft 14 that relatively rotates with respect to the casing 13, and the output shaft 14 is linked to a rotational center $O_1$ (rotational center axis) of the in-wheel drive unit 3.

The output shaft 14 is disposed on the outer side (left side in FIG. 2) of the in-wheel drive unit 3 with respect to the vehicle widthwise direction and is linked to the wheel 1 as mentioned above. Moreover, the casing 13 is disposed on an inner side portion of the in-wheel drive unit 3 with respect to the vehicle widthwise direction and to an outer circumferential portion 3a of the in-wheel drive unit 3, which is radially spaced apart from the rotational center $O_1$ of the in-wheel drive unit 3.

As seen in FIG. 1, the first arm member 4 extends generally in the vehicle longitudinal or lengthwise direction, i.e., in a forward to aft direction. The first arm member 4 includes an in-wheel drive unit attachment portion 5 (hereinafter "first end portion") that is coupled to the outer circumferential portion 3a of the in-wheel drive unit 3 at a position radially spaced apart from the rotational center $O_1$ of the in-wheel drive unit 3. More specifically, in the first embodiment of the present invention, the first end portion 5 is coupled to a lowermost position of the outer circumferential portion 3a of the in-wheel drive unit 3. The first arm member 4 includes a vehicle body attachment portion 6 (hereinafter "second end portion") that is coupled to a bracket 7 that is disposed on a vehicle body side as viewed from the wheel 1.

The first end portion 5 of the first arm member 4 and the outer circumferential portion 3a of the in-wheel drive unit 3 are coupled together so as to pivot about a pivot axis $O_2$ that extends in the vehicle widthwise direction. The second end portion 6 of the first arm member 4 and the bracket 7 are coupled together so as to pivot about a pivot axis $O_3$ that extends in the vehicle widthwise direction and to allow for relative sliding movement therebetween in the vehicle lengthwise direction. Thus, the first end portion 5 of the first arm member 4 is swingable or movable in a vehicle vertical direction with the first end portion 5 disposed on a rear side of the vehicle serving as a free end and the second end portion 6 disposed on a front side of the vehicle serving as a pivot axis. In this embodiment, the rotational center $O_1$ of the in-wheel drive unit 3 is substantially aligned with the pivot axis $O_2$ in the vertical direction of the vehicle.

As seen in FIG. 2, the vertical member 8 extends generally in the vehicle vertical direction. The vertical member 8 includes a lower vertical end portion 9 that is attached to the outer circumferential portion 3a at a position radially spaced apart from the rotational center $O_1$ of the in-wheel drive unit 3. The vertical member 8 includes an upper vertical end portion 10 that is attached to a vehicle body member (not shown). In the first embodiment of the present invention, the outer circumferential portion 3a and the lower vertical end portion 9 are integrally coupled together by fastening a plurality of bolts. The vertical member 8 is preferably arranged as a conventional strut member or the like so that the lower vertical end portion 9 is extendable and contractible in the longitudinal direction of the vertical member 8 (the vehicle vertical direction) with respect to the upper vertical end portion 10. The vertical member 8 is preferably provided with a shock alleviating function including a spring or the like and a damping function including a damper or the like. Thus, the vertical member 8 is configured and arranged to guide the in-wheel drive unit 3 in the vehicle vertical direction.

As shown in FIG. 2, the vertical member 8 is hidden by a vehicle body member 15 when viewed from the vehicle front side. The vehicle body member 15 is omitted in FIGS. 1 and 3 for purposes of illustration. With this arrangement, the passenger compartment space can extend across the entire vehicle widthwise direction between the wheels 1. The passenger compartment space is narrower than the vehicle widthwise direction at a position directly above the wheel 1. The vehicle body member 15 defines a groove portion that extends in the vehicle vertical direction, and the vertical member 8 is disposed within the groove portion formed in the vehicle body member 15.

The first arm member 4 and the vertical member 8 together constitute a suspension device of the present invention that supports or suspends the wheel 1 as a whole including the in-wheel drive unit 3 such that the wheel 1 is swingable (movable) in the vehicle vertical direction with respect to the vehicle body.

The overall length of the first arm member 4 is constant, while the horizontal projection distance between the pivot axis $O_3$ and the first end portion 5 (free end) changes as the first end portion 5 moves generally in the vehicle vertical direction. Therefore, the first end portion 5 moves slightly in the vehicle longitudinal direction as the first end portion 5 swings in the vehicle vertical direction while the wheel 1 bounds and rebounds. Thus, in the first embodiment, the upper vertical end portion 10 of the vertical member 8 includes an elastic coupling formed by elastic material or the like to allow the lower vertical end portion 9 to move in the vehicle longitudinal direction in response to the bounding and rebounding of the wheel 1.

As shown in FIGS. 1 to 3, the lower vertical end portion 9 of the vertical member 8 is integrally coupled to the outer circumferential portion 3a of the in-wheel drive unit 3. In contrast, the first end portion 5 of the first arm member 4 is pivotally coupled to the outer circumferential portion 3a of the in-wheel drive unit 3 about the axis $O_2$. Therefore, even if a driving reaction force moment in the circumferential direction of the wheel 1 is inputted from the ground road surface to the in-wheel drive unit 3 when the vehicle is traveling, the driving reaction force can be prevented from being transmitted to the bracket 7 as a driving reaction force in the vehicle vertical direction with the length of the first arm member 4 serving as the moment arm. Consequently, according to the in-wheel drive unit suspension device of the first embodiment, the ride quality performance during traveling can be improved.

Moreover, according to the in-wheel drive unit suspension device of the present embodiment, it is not necessary to link together the left and right in-wheel drive units 3 (only the right in-wheel drive unit 3 is shown in FIGS. 1 to 3) with a beam that extends in the vehicle widthwise direction. Therefore, the floor of the vehicle body can be lowered between the left and right vertical members 8 (only the right vertical member 8 is shown in FIGS. 1 to 3) disposed on the left and right sides, and the passenger compartment space can be enlarged.

In particular, in the in-wheel drive unit suspension device of the first embodiment, the first arm member 4 and the vertical member 8 of the suspension device are attached to the outer circumferential portion 3a of the in-wheel drive unit 3 at positions radially spaced apart from the rotational center $O_1$ of the in-wheel drive unit 3. Therefore, even with a structure in which the rotational center portion of the in-wheel drive unit 3 protrudes inwardly into the inner space formed in the wheel 1 in the axial direction, the in-wheel drive unit 3, the first end portion 5 of the first arm member 4, and the lower vertical end portion 9 of the vertical member 8 are not aligned in the vehicle widthwise direction. Thus, the floor of the vehicle body can be lowered between the left and right vertical members 8 (only the right vertical member 8 is shown in FIGS. 1 to 3) and between the left and right first arm members 4 (only the right first arm member 4 is shown in FIGS. 1 to 3). Accordingly, the passenger compartment space can be enlarged.

Second Embodiment

Figure 4:
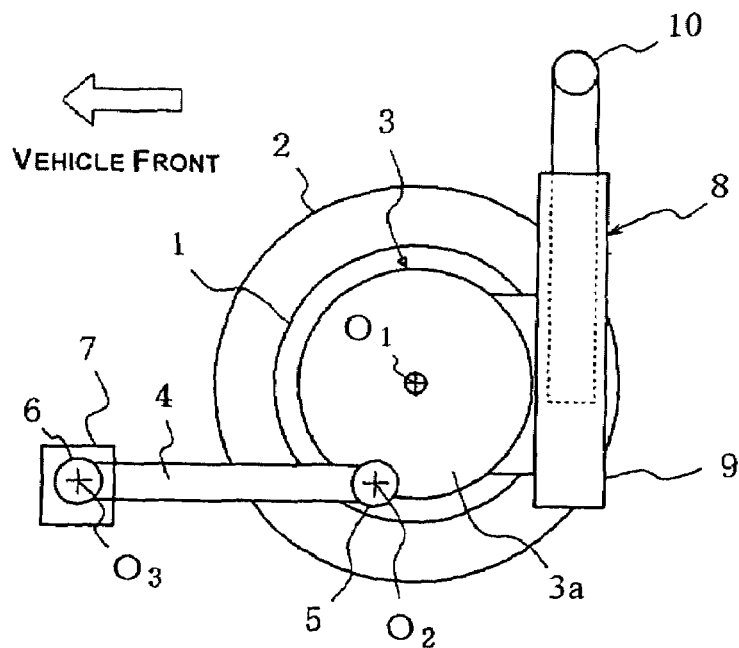
FIG. 4 is an overall schematic side elevational view of an in-wheel drive unit suspension device as viewed from an inner side of a vehicle in accordance with a second embodiment of the present invention.

Referring now to FIG. 4, an in-wheel drive unit suspension device in accordance with a second embodiment will now be explained. The only difference between the first and second embodiments is the connection point of the first end portion 5 (free end) of the first arm member 4 to the outer circumferential portion 3a of the in-wheel drive unit 3. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 4 is an overall schematic side elevational view of the in-wheel drive unit suspension device as viewed from an inner side of a vehicle in accordance with the second embodiment of the present invention. In the first embodiment illustrated in FIGS. 1 to 3, the first end portion 5 of the first arm member 4 is coupled together with the lowermost portion of the outer circumferential portion 3a of the in-wheel drive unit 3. In contrast, in the second embodiment of the present invention, the first end portion 5 (free end) of the first arm member 4 is coupled to a lower front position (toward the second end portion 6) of the outer circumferential portion 3a of the in-wheel drive unit 3 as seen in FIG. 4. In other words, in this embodiment, the rotational center $O_1$ of the in-wheel drive unit 3 is vertically offset towards the front of the vehicle from the pivot axis $O_2$ of the first end portion 5 (free end) of the first arm member 4. Therefore, the attachment position between the first end portion 5 and the in-wheel drive unit 3 is slightly higher than the attachment position in the first embodiment shown in FIG. 3. The first end portion 5 of the first arm member 4 and the outer circumferential portion 3a of the in-wheel drive unit 3 are coupled together so as to pivot about the pivot axis $O_2$ that extends in the vehicle widthwise direction as in the first embodiment. The second end portion 6 of the first arm member 4 and the bracket 7 are coupled together so as to pivot about the pivot axis $O_3$ that extends in the vehicle widthwise direction as in the first embodiment.

Similarly to the first embodiment shown in FIG. 3, in the second embodiment shown in FIG. 4, transmission of the driving reaction force in the vehicle vertical direction can be alleviated and the clearance height from the ground road surface to the first arm member 4 can be increased.

Third Embodiment

Figure 5:
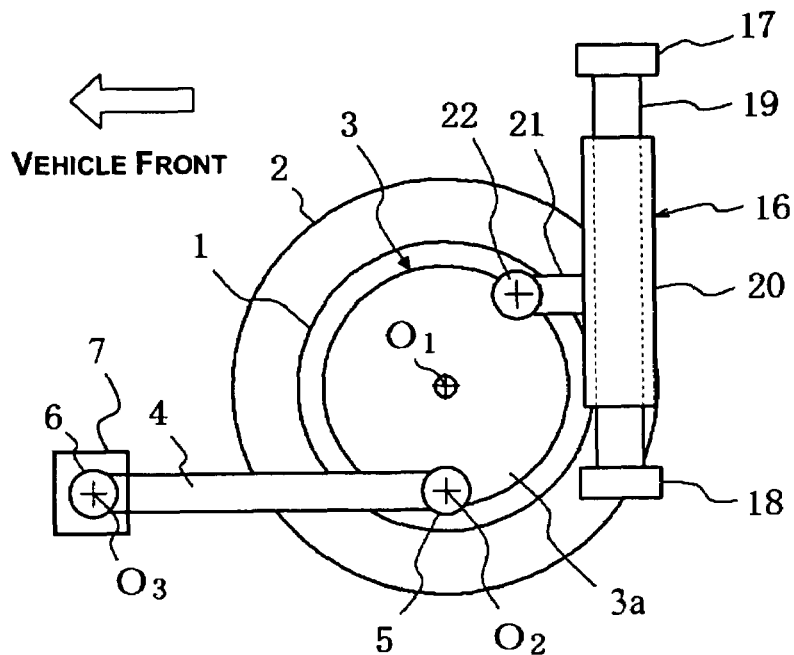
FIG. 5 is an overall schematic side elevational view of an in-wheel drive unit suspension device as viewed from an inner side of a vehicle in accordance with a third embodiment of the present invention.

Referring now to FIG. 5, an in-wheel drive unit suspension device in accordance with a third embodiment will now be explained. The only differences between the first and third embodiments are the structures of the vertical members and the connections of the vertical members to the outer circumferential portion 3a of the in-wheel drive unit 3. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 5 is an overall schematic side elevational view of the in-wheel drive unit suspension device as viewed from an inner side of a vehicle in accordance with the third embodiment of the present invention. The in-wheel drive unit suspension device of the third embodiment differs from the in-wheel drive unit suspension device of the first embodiment in that the third embodiment includes a vertical member 16 that extends generally in the vehicle vertical direction instead of the vertical member 8 of the first embodiment. The vertical member 16 of the third embodiment is disposed adjacent to the outer circumferential portion 3a of the in-wheel drive unit 3 at a position radially spaced apart from the rotational center $O_1$ of the in-wheel drive unit 3. The vertical member 16 basically includes an upper end portion 17, a lower vertical end portion 18, a guide portion 19 and a hollow member 20 (sliding member). The upper and lower vertical end portions 17 and 18 are both coupled to the vehicle body (not shown). The guide portion 19 extends between the upper and lower vertical end portions 17 and 18. The guide portion 19 is slideably coupled to the hollow member 20 (sliding member) such that the hollow member 20 freely slides in the vehicle vertical direction between the upper and lower vertical end portions 17 and 18.

The vertical member 16 further includes a protruding portion 21 that protrudes from the hollow member 20 toward the in-wheel drive unit 3 in the vehicle longitudinal direction. As shown in FIG. 5, a distal end 22 of the protruding portion 21 is pivotally coupled to the outer circumferential portion 3a of the in-wheel drive unit 3. The distal end 22 of the protruding portion 21 is configured and arranged to pivot with respect to the in-wheel drive unit 3 about an axis that extends in the vehicle widthwise direction.

The hollow member 20 and the guide portion 19 are preferably provided therebetween with a spring mechanism, which converts shock inputted from the ground road surface into vertical movements of the hollow member 20, and a damper mechanism, which dampens the vertical movements of the hollow member 20. Thus, the vertical member 16 is configured and arranged to guide the in-wheel drive unit 3 in the vehicle vertical direction.

The first arm member 4 and the vertical member 16 together constitute a suspension device of the present invention that supports or suspends the wheel 1 as a whole including the in-wheel drive unit 3 such that the wheel 1 is swingable (movable) in the vehicle vertical direction with respect to the vehicle body.

Similarly to the first embodiment, the length of the first arm member 4 is constant while the horizontal projection distance between the pivot axis $O_3$ and the first end portion 5 (free end) changes as the first end portion 5 moves generally in the vehicle vertical direction. Therefore, the first end portion 5 moves slightly in the vehicle longitudinal direction as the first end portion 5 swings in the vehicle vertical direction while the wheel 1 bounds and rebounds. Therefore, in the third embodiment of the present invention, the distal end 22 of the protruding portion 21 and the outer circumferential portion 3a of the in-wheel drive unit 3 are relatively rotatably coupled together. Also the distal end 22 of the protruding portion 21 and the first end portion 5 of the first arm member 4 are disposed in a vertical positional relationship with the rotational center $O_1$ being sandwiched therebetween. In other words, the distal end 22 of the protruding portion 21 and the first end portion 5 of the first arm member 4 are disposed on opposite sides with respect to a vehicle longitudinal axis that passes through the rotational center $O_1$. Thus, the hollow member 20 moves up and down in response to the bounding and rebounding of the wheel 1 while the in-wheel drive unit 3 is allowed to rotate in the circumferential direction. Therefore, the attachment portions between the parts are prevented from becoming complicated or twisted.

In the third embodiment shown in FIG. 5, the distal end 22 of the protruding portion 21 that protrudes from the vertical member 16 is pivotally coupled to the outer circumferential portion 3a of the in-wheel drive unit 3. Moreover, the first end portion 5 (free end) of the first arm member 4 is also pivotally coupled to the outer circumferential portion 3a of the in-wheel drive unit 3. With this arrangement, since the in-wheel drive unit 3 is relatively rotatably supported at all of the coupled positions (the first end portion 5 and the distal end 22), even if a driving reaction force moment in the circumferential direction of the wheel 1 is inputted from the ground road surface to the in-wheel drive unit 3 when the vehicle is traveling, the driving reaction force can be prevented from being transmitted to the bracket 7 as a driving reaction force in the vehicle vertical direction with the length of the first arm member 4 serving as the moment arm. Moreover, the driving reaction force can be prevented from being transmitted to a vehicle body member (not shown) as a driving reaction force in the vehicle vertical direction with the length of the protruding portion 21 serving as the moment arm.

Consequently, even if a driving reaction force moment in the circumferential direction is inputted from the ground road surface to the tire 2 when the in-wheel drive unit 3 is driving the wheel 1, the driving reaction force can be prevented from being transmitted to the vehicle body as a driving reaction force in the vertical direction. Accordingly, with the in-wheel drive unit suspension device of the third embodiment, the ride quality performance during traveling can be improved.

Thus, similarly to the first embodiment illustrated in FIGS. 1 to 3, in the third embodiment shown in FIG. 5, the passenger compartment space can be enlarged. Moreover, with the third embodiment, the rigidity of the toe-in and camber of the left and right tires 2 (only one tire 2 is shown in FIG. 5) can be improved. More specifically, in the first embodiment shown in FIGS. 1 to 3, the in-wheel drive unit 3 is coupled to the vehicle body at the two positions (i.e., the second end portion 6 of the first arm member 4 and the upper vertical end portion 10 of the vertical member 8). In contrast, in the third embodiment shown in FIG. 5, the in-wheel drive unit 3 is coupled to the vehicle body at three positions (i.e., the second end portion 6 of the first arm member 4 and the upper and lower vertical end portions 17 and 18 of the vertical member 16). Because the number of attachment places is increased in the third embodiment, the rigidity of the toe-in and the camber of the tires 2 can be improved.

Fourth Embodiment

Figure 6:
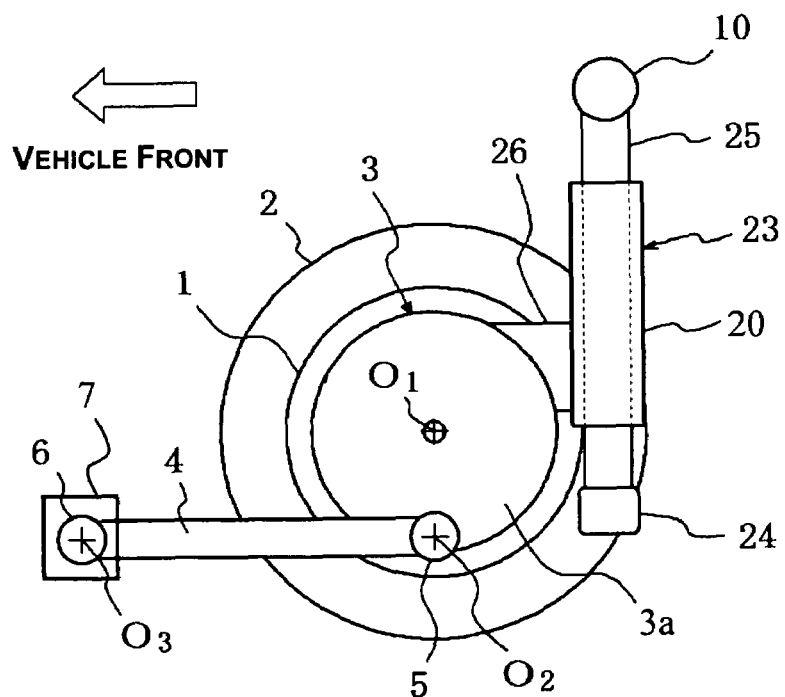
FIG. 6 is an overall schematic side elevational view of an in-wheel drive unit suspension device as viewed from an inner side of a vehicle in accordance with a fourth embodiment of the present invention.
Figure 7:
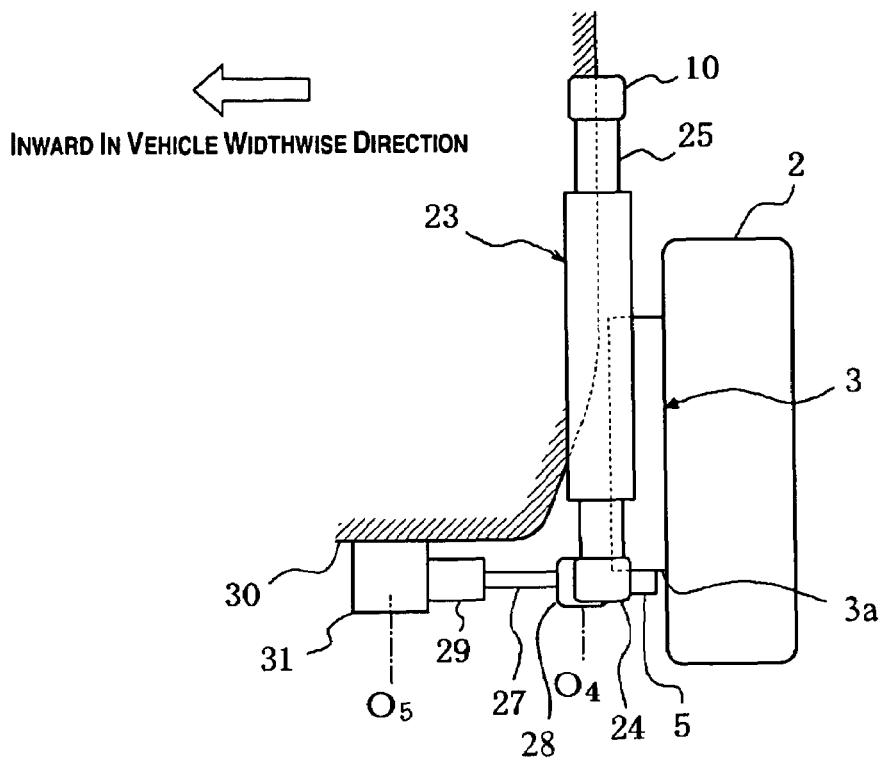
FIG. 7 is an overall schematic rear elevational view of the in-wheel drive unit suspension device in accordance with the fourth embodiment of the present invention.

Referring now to FIGS. 6 and 7, an in-wheel drive unit suspension device in accordance with a fourth embodiment will now be explained. The only differences between the first and fourth embodiments are the structures of the vertical members and the connections of the vertical members to the outer circumferential portion 3a of the in-wheel drive unit 3. In view of the similarity between the first through fourth embodiments, the parts of the fourth embodiment that are identical to the parts of the first through third embodiments will be given the same reference numerals as the parts of the first through third embodiments. Moreover, the descriptions of the parts of the fourth embodiment that are identical to the parts of the first through third embodiments may be omitted for the sake of brevity.

FIG. 6 is an overall schematic side elevational view of the in-wheel drive unit suspension device as viewed from an inner side of a vehicle in accordance with the fourth embodiment. FIG. 7 is an overall schematic rear elevational view of the in-wheel drive unit suspension device in accordance with the fourth embodiment.

The in-wheel drive unit suspension device of the fourth embodiment differs from the in-wheel drive unit suspension device of the first embodiment in that the fourth embodiment includes a vertical member 23 that extends generally in the vehicle vertical direction instead of the vertical member 8 of the first embodiment. As seen in FIG. 6, the vertical member 23 is disposed adjacent to the outer circumferential portion 3a of the in-wheel drive unit 3 at a position radially spaced apart from the rotational center $O_1$ of the in-wheel drive unit 3. The vertical member 23 includes the upper vertical end portion 10 of the first embodiment and a lower vertical end portion 24 with both of the vertical end portions 10 and 24 being coupled to a vehicle body 30 as shown in FIG. 7. The upper vertical end portion 10 of the vertical member 23 has the same elastic coupling structure as that of the upper vertical end portion 10 of the vertical member 8 shown in FIGS. 1 to 4. More specifically, the upper vertical end portion 10 of the vertical member 23 is coupled to the vehicle body 30 so that the lower vertical end portion 24 of the vertical member 23 is movable in the vehicle longitudinal direction in response to the bounding and rebounding of the wheel 1.

As seen in FIG. 7, the lower vertical end portion 24 of the vertical member 23 is coupled to a widthwise arm member 27 that extends in the vehicle widthwise direction. More specifically, the lower vertical end portion 24 of the vertical member 23 is relatively rotatably coupled to an outer end portion 28 (second end portion) of the widthwise arm member 27. Moreover, an inner end portion 29 (first end portion) of the widthwise arm member 27 is relatively rotatably coupled to a bracket 31 of the vehicle body 30. More specifically, the outer end portion 28 of the widthwise arm member 27 is attached to the lower vertical end portion 24 of the vertical member 23 so as to be pivot about a pivot axis $O_4$ that extends in the vehicle vertical direction. The inner end portion 29 of the widthwise arm member 27 is attached to the bracket 31 so as to be pivot about a pivot axis $O_5$ that extends in the vehicle vertical direction. Thus, with the inner end portion 29 serving as a pivot and the outer end portion 28 serving as a free end, the widthwise arm member 27 is swingable in the vehicle longitudinal direction.

The vertical member 23 further includes a guide portion 25 that extends between the upper vertical end portion 10 and the lower vertical end portion 24, and the hollow member 20 slideably coupled to the guide portion 25 such that the hollow member 20 is slideable in the vehicle vertical direction between the upper vertical end portion 10 and the lower vertical end portion 24.

The hollow member 20 and the outer circumferential portion 3a of the in-wheel drive unit 3 are integrally coupled together via a coupling member 26 that extends generally in the vehicle longitudinal direction. Thus, the vertical member 23 is configured and arranged to guide the in-wheel drive unit 3 in the vehicle vertical direction.

The hollow member 20 and the guide portion 25 are preferably provided therebetween with a spring mechanism, which converts shock inputted from the ground road surface into vertical movements of the hollow member 20, and a damper mechanism, which dampens the vertical movements of the hollow member 20.

The first arm member 4 and the vertical member 23 together constitute a suspension device of the present invention that supports or suspends the wheel 1 as a whole including the in-wheel drive unit 3 such that the wheel 1 is swingable (movable) in the vehicle vertical direction with respect to the vehicle body 30.

In the fourth embodiment shown in FIGS. 6 and 7, similarly to the first embodiment shown in FIGS. 1 to 3, the passenger compartment space can be enlarged and transmission of the driving reaction force in the vertical direction can be alleviated. Moreover, similarly to the third embodiment, the rigidity of the toe-in and camber of the tires 2 can be improved in the fourth embodiment. More specifically, in the first embodiment shown in FIGS. 1 to 3, the in-wheel drive unit 3 is coupled to the vehicle body at the two positions (i.e., the second end portion 6 of the first arm member 4 and the upper vertical end portion 10 of the vertical member 8). In contrast, in the fourth embodiment shown in FIGS. 6 and 7, the in-wheel drive unit 3 is coupled to the vehicle body 30 at three positions (i.e., the second end portion 6 of the first arm member 4, the upper vertical end portion 10 and the inner end portion 29 of the widthwise arm member 27). Because the number of attachment places is increased in the fourth embodiment, the rigidity of the toe-in and the camber of the tires 2 can be improved.

Fifth Embodiment

Figure 8:
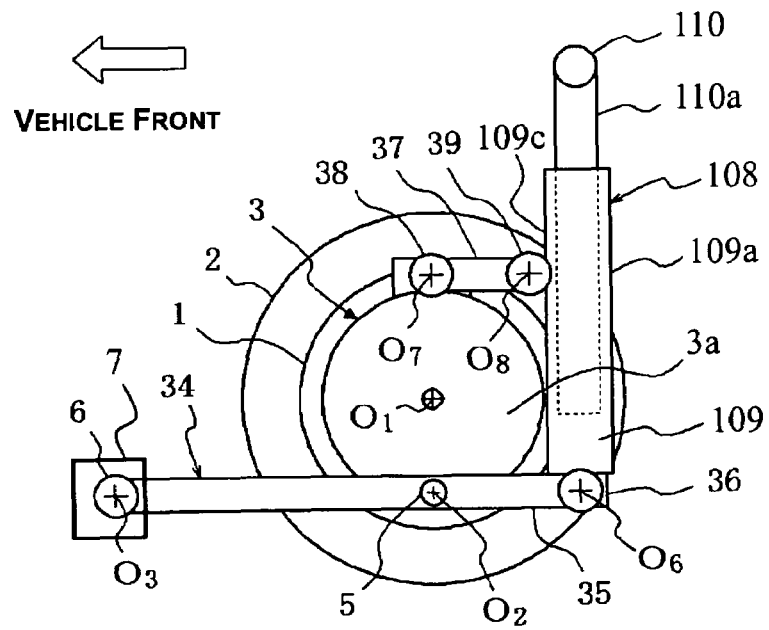
FIG. 8 is an overall schematic side elevational view of an in-wheel drive unit suspension device as viewed from an inner side of a vehicle in accordance with a fifth embodiment of the present invention.

Referring now to FIG. 8, an in-wheel drive unit suspension device in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

FIG. 8 is an overall schematic side elevational view of the in-wheel drive unit suspension device as viewed from an inner side of a vehicle in accordance with the fifth embodiment of the present invention. As seen in FIG. 8, in the fifth embodiment, a vertical member 108 is disposed on a vehicle rear side with respect to the in-wheel drive unit 3 and extends generally in the vehicle vertical direction. A first arm member 34 is disposed at a lower portion of the in-wheel drive unit 3 and extends generally in the vehicle longitudinal direction.

The vertical member 108 includes a hollow cylinder member 109a that vertically extends between a lower vertical end portion 109 and an intermediate portion 109c of the vertical member 108. A lower end of the hollow cylinder member 109a is closed, while an upper end of the hollow cylinder member 109a is open. The vertical member 108 further includes a rod-shaped member 110a that extends downwardly from an upper vertical end portion 110 of the vertical member 108. A diameter of the rod-shaped member 110a is slightly smaller than an inner diameter of the hollow cylinder member 109a so that the rod-shaped member 110a is slideably housed inside the hollow cylinder member 109a. Thus, the intermediate portion 109c and the lower vertical end portion 109 of the vertical member 108 are relatively movable in the vehicle vertical direction with respect to the upper vertical end portion 110 of the vertical member 108. The upper vertical end portion 110 is coupled to a vehicle body member (not shown).

The intermediate portion 109c (disposed on the rear side) is coupled to the outer circumferential portion 3a (disposed on the front side) by a link member 37. The link member 37 includes a front end portion 38 that is coupled to an upper position of the outer circumferential portion 3a so as to pivot about a pivot axis $O_7$ that extends in the vehicle widthwise direction. Moreover, the link member 37 includes a rear end portion 39 that is coupled to the intermediate portion 109c of the vertical member 108 such that they pivot about a pivot axis $O_8$ that extends in the vehicle widthwise direction. Thus, the front end portion 38 and the rear end portion 39 of the link member 37 are relatively movable in the vehicle vertical direction.

The first arm member 34 includes the second end portion 6 that is disposed on the vehicle front side with respect to the in-wheel drive unit 3. The first end portion 5 of the first arm member 34 is coupled to the lower portion of the outer circumferential portion 3a at a position radially spaced apart from the rotational center $O_1$ of the in-wheel drive unit 3. The second end portion 6 of the first arm member 34 is pivotally coupled to a vehicle body member (not shown) via the bracket 7. In other words, the first arm member 34 of the fifth embodiment has a structure in common with that of the first arm member 4 of the first embodiment in that the first arm member 34 is configured and arranged to suspend or support the in-wheel drive unit 3 coupled to the first end portion 5 such that the in-wheel drive unit 3 is swingable in the vehicle vertical direction, with the second end portion 6 serving as a pivot and the first end portion 5 serving as a free end.

However, in the fifth embodiment, the first end portion 5 of the first arm member 34 further extends generally in the vehicle longitudinal direction to form an extension portion 35. A distal end 36 of the extension portion 35 and the lower vertical end portion 109 of the vertical member 108 are coupled together. More specifically, the distal end 36 of the first arm member 34 and the lower vertical end portion 109 of the vertical member 108 are coupled together so as to pivot about a pivot axis $O_6$ that extends in the vehicle widthwise direction. Thus, with the distal end 36 disposed on the vehicle rear side serving as a free end and the second end portion 6 disposed on the vehicle front side serving as a pivot, the distal end 36 of the first arm member 34 is swingable in the vehicle vertical direction.

In the fifth embodiment shown in FIG. 8, similarly to the previous embodiments shown in FIGS. 1 to 7, the passenger compartment space can be enlarged. Moreover, as in the third and the fourth embodiments, the rigidity of the toe-in and the camber of the tires 2 can be improved. More specifically, in the first embodiment shown in FIGS. 1 to 3, the in-wheel drive unit 3 suspended at the two positions (i.e., the first end portion 5 of the first arm member 4 and the lower vertical end portion 9 of the vertical member 8). In contrast, although the fifth embodiment shown in FIG. 8 has a common structure as in the first embodiment where the in-wheel drive unit 3 is suspended at the two positions (i.e., the first end portion 5 of the first arm member 34 and the intermediate portion 109c of the vertical member 108), the distal end 36 of the first arm member 34 and the lower vertical end portion 109 of the vertical member 108 are further coupled together. Because an additional coupling place between the vertical member 108 and the first arm member 34 is provided in the fifth embodiment, the in-wheel drive unit 3, the first arm member 34, the vertical member 108, and the link member 37 are linked such that they are positioned substantially on the same plane. Consequently, the rigidity of the toe-in and the camber of the tire 2 can be improved.

Further, in the fifth embodiment shown in FIG. 8, the link member 37 is pivotally coupled at the front end portion 38 to the outer circumferential portion 3a of the in-wheel drive unit 3. Moreover, the first arm member 34 is also pivotally coupled at the first end portion 5 to the outer circumferential portion 3a of the in-wheel drive unit 3. Because the in-wheel drive unit 3 is relatively rotatably coupled at both of the coupled positions (the first end portion 5 and the front end portion 38) with this arrangement, even if a driving reaction force moment in the circumferential direction of the wheel 1 is inputted from the ground road surface to the in-wheel drive unit 3 when the vehicle is traveling, the driving reaction force can be prevented from being transmitted to the bracket 7 as a driving reaction force in the vehicle vertical direction with the length of the first arm member 34 serving as the moment arm. Moreover, the driving reaction force can be prevented from being transmitted to a vehicle body member (not shown) as a driving reaction force in the vehicle vertical direction with the length of the link member 37 serving as the moment arm.

Consequently, even if a driving reaction force moment in the circumferential direction is inputted from the ground road surface to the tire 2 when the in-wheel drive unit 3 is driving the wheel 1, the driving reaction force can be prevented from being transmitted to the vehicle body as a driving reaction force in the vertical direction. Accordingly, with the in-wheel drive unit suspension device of the third embodiment, the ride quality performance during traveling can be improved.

Sixth Embodiment

Figure 9:
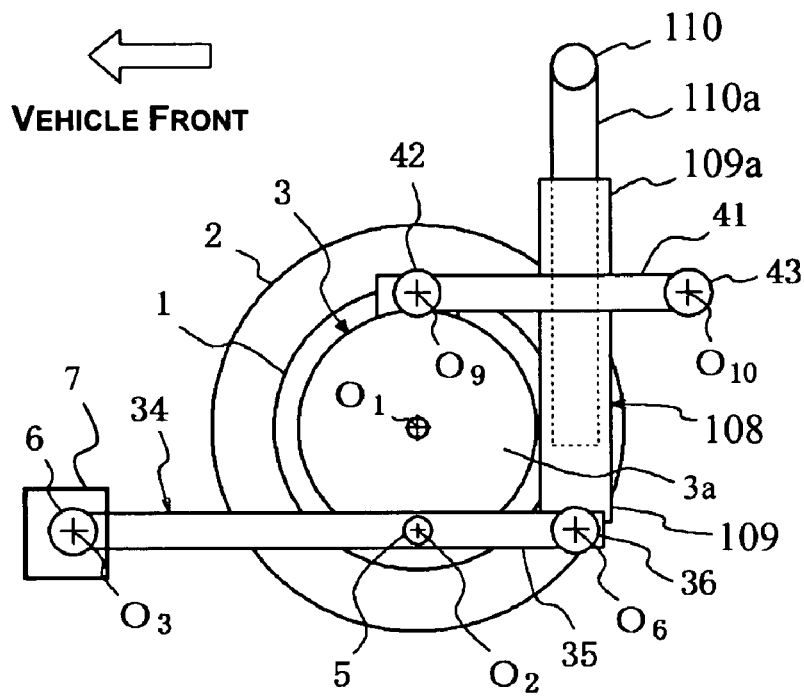
FIG. 9 is an overall schematic side elevational view of an in-wheel drive unit suspension device as viewed from an inner side of a vehicle in accordance with a sixth embodiment of the present invention.

Referring now to FIG. 9, an in-wheel drive unit suspension device in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

FIG. 9 is an overall schematic side elevational view of the in-wheel drive unit suspension device as viewed from an inner side of a vehicle in accordance with the sixth embodiment of the present invention. The in-wheel drive unit suspension device of the sixth embodiment differs from the in-wheel drive unit suspension device of the fifth embodiment in that a second arm member 41 is provided in the sixth embodiment. As seen in FIG. 9, the second arm member 41 extends generally in the vehicle longitudinal direction toward a rear side with respect to the in-wheel drive unit 3.

The first end portion 5 of the first arm member 34 is coupled to the lower portion of the outer circumferential portion 3a. The second arm member 41 includes a front end portion 42 (first end portion) that is coupled to the outer circumferential portion 3a of the in-wheel drive unit 3 at a position that is substantially symmetrical to the coupling position between the first end portion 5 and the outer circumferential portion 3a with respect to the rotational center $O_1$ of the in-wheel drive unit 3. More specifically, in the sixth embodiment of the present invention, the first end portion 5 of the first arm member 4 is pivotally coupled to the lowermost position of the outer circumferential portion 3a, and the front end portion 42 of the second arm member 41 is pivotally coupled to the uppermost position of the outer circumferential portion 3a. The front end portion 42 of the second arm member 41 is pivotally coupled to the outer circumferential portion 3a about an axis $O_9$ that extends in the vehicle widthwise direction. The second arm member 41 further includes a rear end portion 43 that is coupled to a vehicle body member (not shown). The rear end portion 43 (second end portion) of the second arm member 41 and the vehicle body member are pivotally coupled together about an axis $O_{10}$ that extends in the vehicle widthwise direction. Thus, the front end portion 42 and the rear end portion 43 of the second arm member 41 are relatively movable in the vehicle vertical direction.

The lower vertical end portion 109 of the vertical member 108 is pivotally coupled to the distal end 36 of the extension portion 35 of the first arm member 34. Thus, the lower vertical end portion 109 is attached to the outer circumferential portion 3a of the in-wheel drive unit 3 via the extension portion 35 of the first arm member 34.

The lengths of the first arm member 34 and the second arm member 41 are constant while the horizontal projection distance between the pivot axis $O_3$ and the first end portion 5 (free end) and the horizontal projection distance between the front end portion 42 and the rear end portion 43 of the second arm member 41 change as the first end portion 5 and the front end portion 42 move generally in the vehicle vertical direction. Therefore, the first end portion 5 and the front end portion 42 move slightly in the vehicle longitudinal direction as the first end portion 5 and the front end portion 42 swings in the vehicle vertical direction while the wheel 1 bounds and rebounds.

Therefore, in the sixth embodiment of the present invention, the front end portion 42 of the second arm member 41 and the outer circumferential portion 3a of the in-wheel drive unit 3 are relatively rotatably coupled together, and the front end portion 42 and the first end portion 5 are disposed in upper and lower positions, respectively, that are substantially symmetrical about the rotational center $O_1$ of the in-wheel drive unit 3. In other words, the front end portion 42 of the second arm member 41 and the first end portion of the first arm member 34 are disposed on opposite sides with respect to a vehicle longitudinal axis that passes through the rotational center $O_1$. Thus, the lower vertical end portion 109 of the vertical member 108 moves up and down in response to the bounding and rebounding of the wheel 1 while the in-wheel drive unit 3 is allowed to rotate in the circumferential direction. Therefore, the attachment portions between the parts are prevented from becoming complicated or twisted.

In the sixth embodiment shown in FIG. 9, similarly to the previous embodiments shown in FIGS. 1 to 8, the passenger compartment space can be enlarged. Moreover, as in the third through fifth embodiments, the rigidity of the toe-in and the camber of the tires 2 can be improved. More specifically, in the first embodiment shown in FIGS. 1 to 3, the in-wheel drive unit 3 is coupled to the vehicle body at the two positions (i.e., the first end portion 5 of the first arm member 4 and the lower vertical end portion 9 of the vertical member 8). In contrast, although the sixth embodiment shown in FIG. 9 has a common structure as in the first embodiment where the in-wheel drive unit 3 is suspended at the two positions (i.e., the first end portion 5 of the first arm member 34 and the front end portion 42 of the second arm member 41), the distal end 36 of the first arm member 34 and the lower vertical end portion 109 of the vertical member 108 are further coupled together. Because an additional coupling place between the vertical member 108 and the first arm member 34 is provided in the fifth embodiment, the in-wheel drive unit 3, the first arm member 34, the vertical member 108, and the link member 37 are linked such that they are positioned substantially on the same plane. Consequently, the rigidity of the toe-in and the camber of the tire 2 can be improved.

Seventh Embodiment

Figure 10:
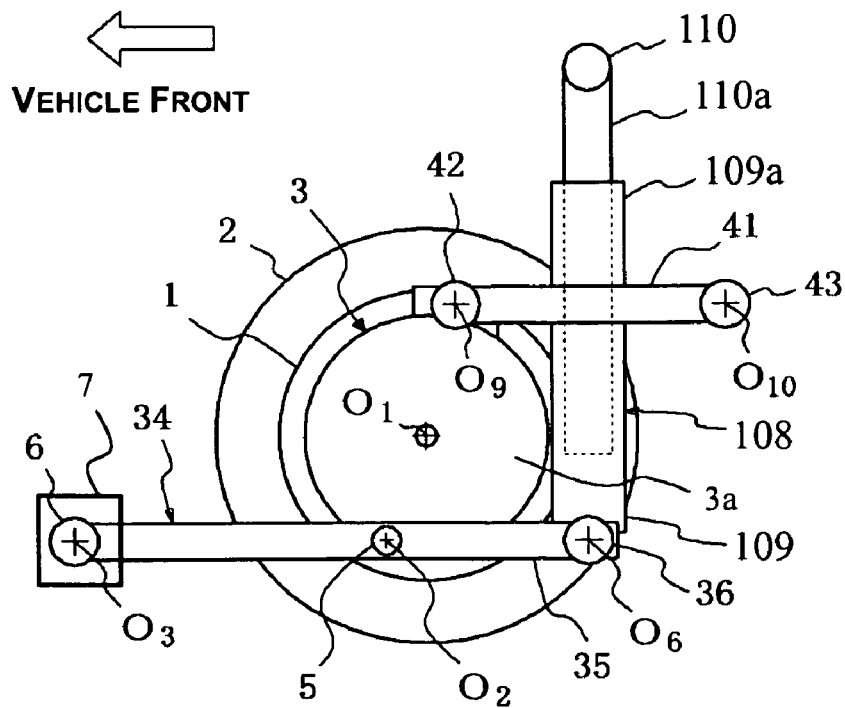
FIG. 10 is an overall schematic side elevational view of an in-wheel drive unit suspension device as viewed from an inner side of a vehicle in accordance with a seventh embodiment of the present invention.

Referring now to FIG. 10, an in-wheel drive unit suspension device in accordance with a seventh embodiment will now be explained. Basically, the sixth and seventh embodiments are the same, except for the location of the connection point of the first end portion 5 of the first arm member 34 to the outer circumferential portion 3a of the in-wheel drive unit 3. In view of the similarity between the first, second, sixth and seventh embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

FIG. 10 is an overall schematic side elevational view of the in-wheel drive unit suspension device as viewed from an inner side of a vehicle in accordance with the seventh embodiment of the present invention. In the sixth embodiment illustrated in FIG. 9, the first end portion 5 of the first arm member 34 is coupled together with the lowermost portion of the outer circumferential portion 3a of the in-wheel drive unit 3. In contrast, in the seventh embodiment of the present invention, the first end portion 5 (an intermediate point of the free end) of the first arm member 34 is coupled to a lower front position (toward the second end portion 6) of the outer circumferential portion 3a of the in-wheel drive unit 3 as seen in FIG. 10. Therefore, the attachment position between the first end portion 5 and the in-wheel drive unit 3 is slightly higher than the attachment position in the sixth embodiment shown in FIG. 9. Rather the attachment position between the first end portion 5 and the in-wheel drive unit 3 is the same as in the second embodiment shown in FIG. 3. The front end portion 42 of the second arm member 41 is coupled to the outer circumferential portion 3a at a position that is substantially symmetrical to the position of the first end portion 5 about the rotational center $O_1$ of the in-wheel drive unit 3. The first end portion 5 of the first arm member 34 and the outer circumferential portion 3a of the in-wheel drive unit 3 are coupled together so as to pivot about the pivot axis $O_2$ that extends in the vehicle widthwise direction. The second end portion 6 of the first arm member 34 and the bracket 7 are coupled together so as to pivot about the pivot axis $O_3$ that extends in the vehicle widthwise direction as in at least the first, second and sixth embodiments.

Similarly to the sixth embodiment shown in FIG. 9, in the seventh embodiment shown in FIG. 10, transmission of the driving reaction force in the vehicle vertical direction can be alleviated and the clearance height from the ground road surface to the first arm member 34 can be increased.

The present invention is not limited to the first to seventh embodiments, and numerous modifications and changes are possible. For instance, although it is not illustrated in FIGS. 1 to 10, in each of the first through seventh embodiments, the proximal end of the first arm member 4 or 34 may be disposed on the rear side of the in-wheel drive unit 3, and the vertical member 8, 16, 23 or 108 can be disposed on the front side of the in-wheel drive unit 3.

Furthermore, the sixth and seventh embodiments shown in FIGS. 9 and 10, respectively may also be configured and arranged such that the vertical member 108 is coupled to the second arm member 41 rather than being coupled to the first arm member 34 to guide the in-wheel drive unit 3 in the vehicle vertical direction.

According to the in-wheel drive unit suspension device of the present invention, the in-wheel drive unit 3 can be suspended or supported with a member that extends substantially in the vehicle vertical direction and/or a member that extends in the vehicle vertical direction without relying primary on a member that extends in the vehicle widthwise direction. Therefore, the floor of the vehicle body can be extended between the left and right in-wheel drive units 3 and the passenger compartment space can be enlarged.

Moreover, the in-wheel drive unit 3 usually has a thickness in the vehicle widthwise direction, that is, the rotational center axis direction. In the present invention, the first arm member and the vertical member that suspend the in-wheel drive unit 3 are attached to the outer circumferential portion 3*a* of the in-wheel drive unit 3 at positions radially spaced apart from the rotational center $O_1$. Therefore, all of the space between the pair of left and right in-wheel drive units 3 can be used for installing the vehicle body, and the passenger compartment space can be enlarged.

Furthermore, since the one end of the first arm member is relatively rotatably coupled to the outer circumferential portion 3*a* of the in-wheel drive unit 3, the input of the driving reaction force generated by the motor 11 to the vehicle body as force in the vertical direction can be reduced, and the passenger ride quality performance can be improved.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An in-wheel drive unit suspension device comprising:
a first arm member extending generally in a vehicle longitudinal direction with an in-wheel drive unit attachment portion of the first arm member being configured and arranged to be pivotally attached to an outer circumferential portion of an in-wheel drive unit about a pivot axis that extends in a vehicle widthwise direction at a position radially spaced apart from a rotational center of the in-wheel drive unit and a vehicle body attachment portion of the first arm member being configured and arranged to be pivotally attached to a vehicle body about a pivot axis that extends in the vehicle widthwise direction so that the in-wheel drive unit is movable in a vehicle vertical direction with respect to the vehicle body; and
a vertical member extending generally in a vehicle vertical direction with a first part of the vertical member being configured and arranged to be attached to the outer circumferential portion of the in-wheel drive unit and a second part of the vertical member being configured and arranged to be attached to the vehicle body to guide the in-wheel drive unit in the vehicle vertical direction.

2. The in-wheel drive unit suspension device as recited in claim 1, wherein
the first and second parts of the vertical member are movable relative to each other in the vehicle longitudinal direction with respect to the vehicle body.

3. The in-wheel drive unit suspension device as recited in claim 1, wherein
the second part of the vertical member includes upper and lower vertical end portions that are configured and arranged to be coupled to the vehicle body, and
the first part of the vertical member includes a sliding member that is slidable between the upper and lower vertical end portions of the second part with the sliding member being coupled to the outer circumferential portion of the in-wheel drive unit.

4. The in-wheel drive unit suspension device as recited in claim 3, further comprising
a widthwise arm member extending generally in a vehicle widthwise direction with a first end portion pivotally coupled to the vehicle body and a second end portion pivotally coupled to the lower vertical end portion of the second part of the vertical member,
the upper vertical end portion of the vertical member is pivotally coupled to the vehicle body.

5. The in-wheel drive unit suspension device as recited in claim 1, wherein
the first arm member and the vertical member are configured and arranged to be disposed generally on opposite sides with respect to a center vertical axis of the in-wheel drive unit.

6. The in-wheel drive unit suspension device as recited in claim 1, wherein
the second part of the vertical member forms an upper vertical end portion of the vertical member and the first part of the vertical member forms a lower vertical end portion with an intermediate part disposed between the first and second parts such that the first part and the intermediate portion are movable in the vehicle vertical direction with respect to the second part, and the intermediate part being configured and arranged to be coupled to the outer circumferential portion of the in-wheel drive unit via a link member.

7. The in-wheel drive unit suspension device as recited in claim 6, wherein
the first arm member further includes an extension portion that extends from the in-wheel drive unit attachment portion generally in the vehicle longitudinal direction with the extension portion being pivotally coupled to the lower vertical end portion of the vertical member.

8. The in-wheel drive unit suspension device as recited in claim 7, wherein
the first arm member and the vertical member are configured and arranged to be disposed generally on opposite sides with respect to a center vertical axis of the in-wheel drive unit.

9. The in-wheel drive unit suspension device as recited in claim 1, further comprising
a second arm member extending generally in the vehicle longitudinal direction disposed on an generally opposite side from the first arm member with respect to a vertical center axis of the in-wheel drive unit, the second arm member having an in-wheel drive unit attachment portion configured and arranged to be pivotally coupled to the outer circumferential portion of the in-wheel drive unit and a vehicle body attachment portion configured and arranged to be coupled to the vehicle body such that the in-wheel drive unit attachment portion of the second arm member and the in-wheel drive unit attachment portion of the first arm member are disposed in positions substantially symmetrical with respect to the rotational center of the in-wheel drive unit.

10. The in-wheel drive unit suspension device as recited in claim 9, wherein
the vertical member is coupled to at least one of the first and second arm members so as to be supported on the outer circumferential portion of the in-wheel drive unit via at least one of the first and second arm members.

11. The in-wheel drive unit suspension device as recited in claim 1, wherein
the in-wheel drive unit attachment portion of the first arm member is configured and arranged to be pivotally coupled to the in-wheel drive unit at a lowermost position in the outer circumferential portion.

12. The in-wheel drive unit suspension device as recited in claim 1, wherein
the in-wheel drive unit attachment portion of the first arm member is configured and arranged to be pivotally coupled to the in-wheel drive unit at a position in the outer circumferential portion toward the vehicle body attachment portion of the first arm member.

13. An in-wheel drive unit suspension device comprising:
longitudinal support means, extending generally in a vehicle longitudinal direction, for pivotally supporting an in-wheel drive unit disposed inside a wheel with respect to a vehicle body about a pivot axis that extends in a vehicle widthwise direction at a position on an outer circumferential portion of the in-wheel drive unit that is spaced apart from a rotational center of the in-wheel drive unit so that the in-wheel drive unit is movable in a vehicle vertical direction with respect to the vehicle body; and
vertical support means, extending generally in a vehicle vertical direction, for guiding the in-wheel drive unit in the vehicle vertical direction with respect to the vehicle body.

14. An in-wheel drive unit suspension arrangement comprising:
an in-wheel drive unit configured and arranged to be disposed inside a wheel;
a first arm member extending generally in a vehicle longitudinal direction with an in-wheel drive unit attachment portion of the first arm member pivotally attached to an outer circumferential portion of the in-wheel drive unit about a pivot axis that extends in a vehicle widthwise direction at a position radially spaced apart from a rotational center of the in-wheel drive unit and a vehicle body attachment portion of the first arm member being configured and arranged to be pivotally attached to a vehicle body about a pivot axis that extends in the vehicle widthwise direction so that the in-wheel drive unit is movable in a vehicle vertical direction with respect to the vehicle body; and
a vertical member extending generally in a vehicle vertical direction with a first part of the vertical member attached to the outer circumferential portion of the in-wheel drive unit and a second part of the vertical member being configured and arranged to be attached to the vehicle body to guide the in-wheel drive unit in the vehicle vertical direction.

* * * * *